United States Patent [19]
Lee et al.

[11] Patent Number: 5,874,683
[45] Date of Patent: Feb. 23, 1999

[54] CHARACTERISTIC COMPARATIVE MEASUREMENT SYSTEM OF MOTOR FAN IN VACUUM CLEANER

[75] Inventors: Nam-Seon Lee, Kwangju; Jong-Soo Choi, Taejeon; Kie-Yong Lee, Kwangju, all of Rep. of Korea

[73] Assignee: Kwangju Electronics Co., Ltd., Kwangju, Rep. of Korea

[21] Appl. No.: 863,664

[22] Filed: May 27, 1997

[30] Foreign Application Priority Data

May 29, 1996 [KR] Rep. of Korea ............ 96-18610
May 29, 1996 [KR] Rep. of Korea ............ 96-18611
Sep. 10, 1996 [KR] Rep. of Korea ............ 96-39109

[51] Int. Cl.$^6$ .................................. G01M 9/00
[52] U.S. Cl. .................. 73/865.9; 73/147; 15/339
[58] Field of Search .................. 73/147, 865.9, 73/170.14; 15/319, 339

[56] References Cited

U.S. PATENT DOCUMENTS

| | | | |
|---|---|---|---|
| 3,285,062 | 11/1966 | Flader | 73/147 |
| 4,087,927 | 5/1978 | Basmajian | 73/147 |
| 4,750,355 | 6/1988 | Urabe et al. | 73/147 |
| 4,751,844 | 6/1988 | Matsushita | 73/147 |
| 5,023,973 | 6/1991 | Tsuchida et al. | 15/319 |
| 5,033,151 | 7/1991 | Kraft et al. | 15/319 |
| 5,255,409 | 10/1993 | Fuliwara et al. | 15/319 |
| 5,396,793 | 3/1995 | Colletti | 73/865.6 |
| 5,404,612 | 4/1995 | Ishikawa | 15/319 |
| 5,501,101 | 3/1996 | Purcell | 73/147 |
| 5,627,311 | 5/1997 | Nakaya et al. | 73/865.6 |
| 5,722,109 | 3/1998 | Delmas et al. | 15/319 |

FOREIGN PATENT DOCUMENTS 57-184944  11/1982  Japan ................... 73/865.6

*Primary Examiner*—Ronald Biegel
*Attorney, Agent, or Firm*—Majestic, Parsons, Siebert & Hsue P.C.

[57] ABSTRACT

This invention provides a system for measuring and comparing various characteristics of a motor fan rotated by a power generating unit, the system including the power generating unit for rotating the fan, a housing containing the power generating unit therein and being formed with a suction inlet for drawing air during rotation of the fan and a discharge outlet for discharging the air absorbed through the suction inlet, a supporting unit installed into the housing for supporting the power generating unit, a protection unit having in a front surface thereof a suction hole for drawing the air, for protecting breakage of the fan, a vacuum measuring unit installed to measure a vacuum in the housing, a wind amount regulating unit for controlling a draining port of the housing so as to maintain optimal vacuum in the housing, a revolution measurement unit for measuring revolution of the rotating unit installed to the power generating unit, and a torque table for measuring torque.

7 Claims, 3 Drawing Sheets

CHARACTERISTIC COMPARATIVE MEASUREMENT SYSTEM OF MOTOR FAN IN VACUUM CLEANER

BACKGROUND OF THE INVENTION

1. Field of the Invention

The invention relates to a characteristic comparative measurement system of a motor fan in a vacuum cleaner, for comparing characteristics uniquely exhibited in a configuration of the fan rotated by a power generating means, and more particularly, to a system which provides easy measurement of basic characteristics, such as revolution, torque, vacuum and wind amount of each fan by simply changing the fan, which contributes to developing an effective fan.

2. Description of the Prior Art

A vacuum cleaner generally requires a fan which is used to provide suction. However, specific configurations of the fan may affect the suction.

In most cases, a fan is installed into a product without consideration of the significant factors thereof, such as the advantageous characteristics the fan configuration would give or the revolution of the power generating means, so that it may result in poor suction performance for the vacuum cleaner and lowered product quality.

Also, there is a problem in that influential factors, such as vacuum, wind amount, and revolution, as well as torque according to revolution of the fan cannot be properly examined.

SUMMARY OF THE INVENTION

Therefore, it is an object of the present invention to provide a characteristic comparative measurement system of a motor fan used in, for example, a vacuum cleaner or the like, contributing to the effective development of a fan, adapted to measure basic characteristics such as revolution, torque, vacuum and wind amount of the fan, for designing an optimally-operated fan prior to the mass production thereof.

The above objects are accomplished by the system for measuring and comparing various characteristics of a fan, the system comprising:

- a power generating means for rotating the fan;
- a housing for containing the power generating means therein and being formed with a suction inlet for drawing air during rotation of the fan and a discharge outlet for discharging the air absorbed through the suction inlet;
- a supporting means installed in the housing for supporting the power generating means;
- a protection means having a suction hole at a front surface thereof for drawing the air, which protects against breakage of the fan;
- a vacuum measuring means installed to measure the vacuum in the housing;
- a wind amount regulating means for controlling the draining port of the housing so as to maintain an optimal vacuum in the housing;
- a revolution measurement means for measuring the revolution of the rotating means installed at the power generating means; and
- a torque table as a means for measuring the torque of the fan.

BRIEF DESCRIPTION OF THE DRAWINGS

Other objects and aspects of the invention will become apparent from the following description of embodiments with reference to the accompanying drawing in which.

DETAILED DESCRIPTION OF THE PREFERRED EMBODIMENT

The preferred embodiment according to the present invention will now be described in detail in accordance with the accompanying drawings.

Figure 1:
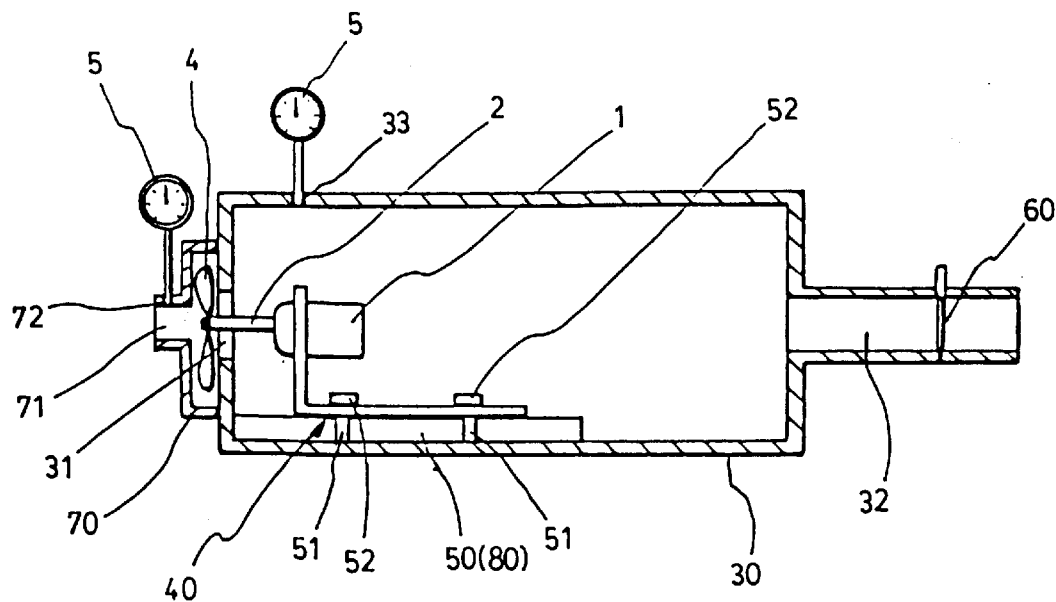
FIG. 1 schematically shows the internal configuration of a characteristic comparative measurement system of a motor fan in accordance with the present invention.
Figure 2:
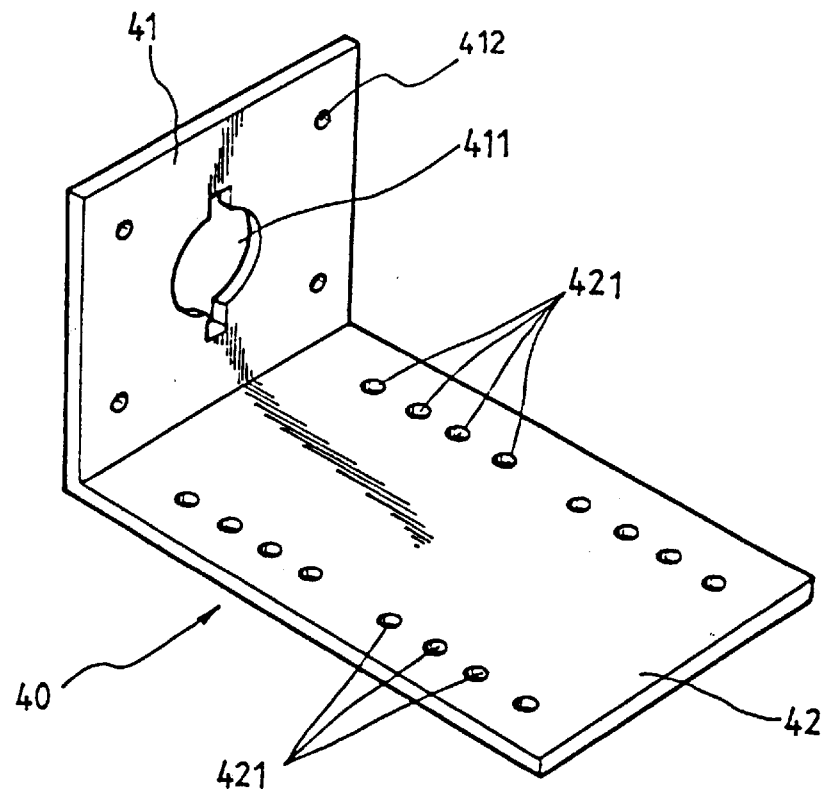
FIG. 2 shows a perspective view of the supporting means applied to the present invention.

FIG. 1 schematically shows the internal configuration of a characteristic comparative measurement system of a motor fan in accordance with the present invention, and FIG. 2 shows a perspective view of the supporting means applied to the present invention.

In FIG. 1, reference numeral 1 denotes the power generating means for generating rotational power which a first shaft 2 is coupled thereto to be rotated in response to the rotational power generated.

A fan 4 specifically configured can be coupled separately to the shaft 2, allowing for comparison and analysis of specific characteristics which each fan coupled thereto exhibits, respectively.

A housing 30 has a power generating means 1 for rotating the fan 4 therein such that various characteristics to the fan configuration are compared and analyzed for every fan, and is formed with a suction inlet 31 for drawing air during rotation of the fan and a discharge outlet 32 for discharging the air absorbed through the suction inlet 31.

Further, the housing 30 has a means 40 for supporting the power generating means 1 inside.

The supporting means 40 includes, as shown in FIG. 2, a front supporting portion 41 in which a receiving portion 411 and fixing holes 412 are formed for accommodating and fixing the power generating means 1, and a bottom supporting portion 42 integrally formed with the front supporting means 41 in which a plurality of holes 421 are perforated such that the power generating means 1 is positioned at one selected location provided by the holes.

Further, the housing 30 is provided with a base member 50 having fixing holes 51 therein such that the supporting means 40 is securely fixed thereto by coupling a fixing member 52, such as a bolt, etc., into the holes 51.

Still further, the housing 30 also has a draining port 32 controlled by the wind amount regulating means 60 which is installed thereto and operated to maintain optimal vacuum in the housing 30.

On a front surface of the housing 30, a protection means 70 is assembled considering the possibility of breakage of the fan and possible injury to an operator.

The protection means 70 has a suction hole 71 for taking up air when the fan 4 rotates, and the hole 71 also has an insertion hole 72 to which the vacuum measuring means 5 is installed to measure the vacuum for the absorbed air.

In measuring the vacuum using the above-described system, first, the external protrusion condition of the first shaft 2 coupled to the power generating means 1 is confirmed after decoupling the protection means 70 from the housing 30. The fan 4 to be analyzed is then coupled onto the first shaft 2, followed by coupling the protection means 70 to guard against any possible injury to the operator. Upon completion of such preparation to measure the vacuum, electric power is applied to the power generating means 1 for rotation action thereof.

The rotation of the first shaft 2 caused by the rotational power generated from the power generating means 1 allows the fan 4 to be rotated accordingly, following suction of air through the suction hole 71. The vacuum measuring means 5 coupled to the protection means 70 measures the vacuum for the absorbed air through the suction hole 71. Air which has experienced vacuum measurement is discharged outside through the draining port 32. At this time, the varied internal vacuum of the housing 30 is measured by the vacuum measuring means 5 coupled to the housing 30.

Using two measured vacuums for both the suction hole 71 and the housing 30, the respective characteristics that the fans 4 have are compared and analyzed, and one can select an optimal fan 4 accordingly.

Figure 3:
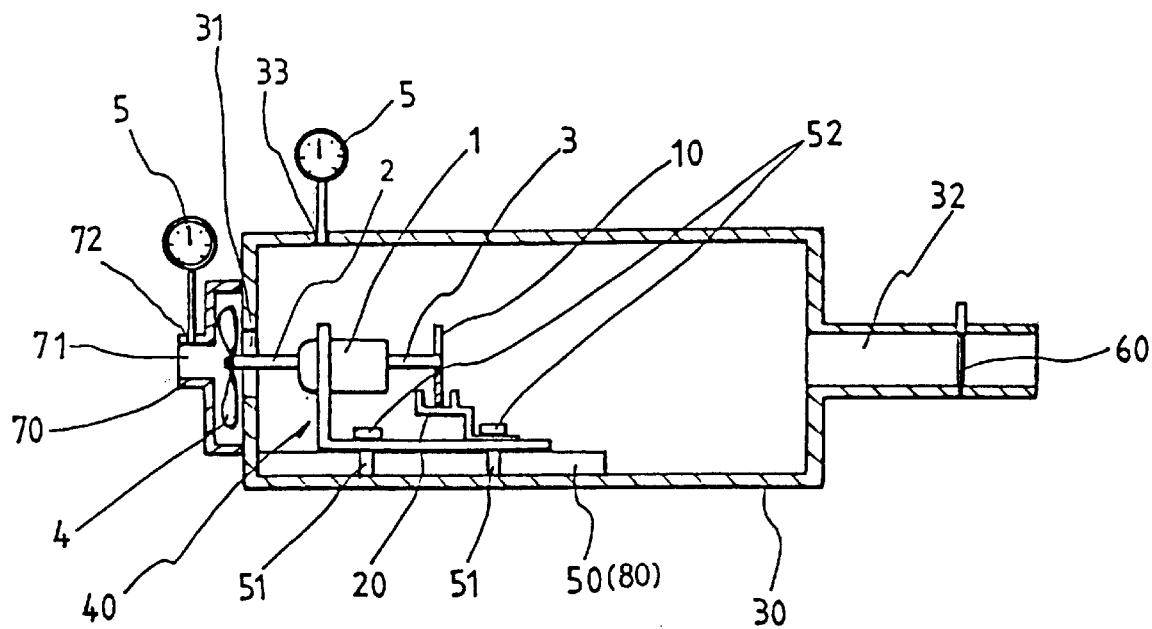
FIG. 3 schematically shows the internal configuration of the characteristic comparative measurement system in FIG. 1, further comprising a rotating means and a revolution measuring means.

Meanwhile, FIG. 3 schematically shows an internal configuration of the same characteristic comparative measurement system as in FIG. 1, except that the system further comprises a rotating means 10 and a revolution measurement means 20, and further a second shaft 3 is coupled to the power generating means 1 opposite to the first shaft 2, wherein the rotating means 10 is coupled to the second shaft 3 and rotated in response to the power generating means 1 action.

Figure 4:
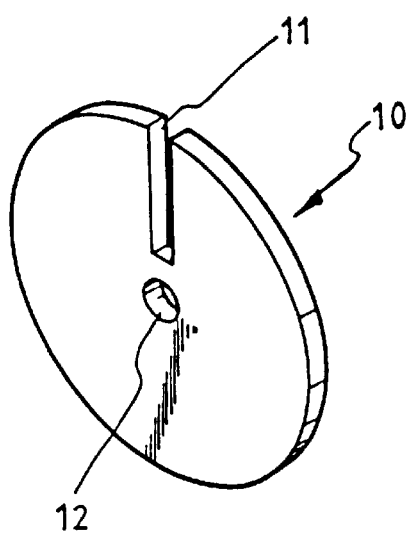
FIG. 4 shows a perspective view of the rotating means in FIG. 3.

The rotating means 10 is configured, as shown in FIG. 4, such that at a central point of the means 10, a through hole 12 is formed for inserting the second shaft 3, and at an appropriate location in the means 10, a slot 11 is formed through which a light is transmitted. Using the transmission of light through the slot allows the revolutions of the power generating means to be measured by the revolution measuring means 20. The slot 11 is preferably oriented towards the through hole 12 ending at the outer edge of the rotating means 10.

Further, the revolution measurement means 20 supported by the supporting means to be described later consists of a detecting means having a pair of light emitting elements and light receiving elements which are, respectively, located near both sides of the rotating means 10, and a controller electrically coupled to the detecting means, wherein when the light emitted from the light emitting element is delivered to the light receiving means only through the slot 10 during rotation of the rotating means 10, the light receiving means in turn outputs pulse signals to the controller, and then the controller measures the revolution of the power generating means 1 by counting the pulses received.

Referring again to FIGS. 1 and 3, for the base member 50 installed to align the first shaft direction with a central axis of the suction hole 31, alternatively, the member 40 may be instead, a well-known torque table 80 providing the torque value of the power generating means 1, with its operation mechanism so that when a force caused by the vibration generated when the power generating means 1 is rotated is delivered to the supporting means 40, this occurrence causes resistance variation which can correspondingly indicate the desired torque value. More specifically, in case a force is generated when the motor is rotated and is conveyed to a moving body movably installed over a fixed body which is fixed into the housing 30, the force delivered to the moving body of the torque table is converted into resistance, variances of which may be displayed through a monitor connected to a personal computer, or an oscilloscope connected to the torque table.

Figure 5:
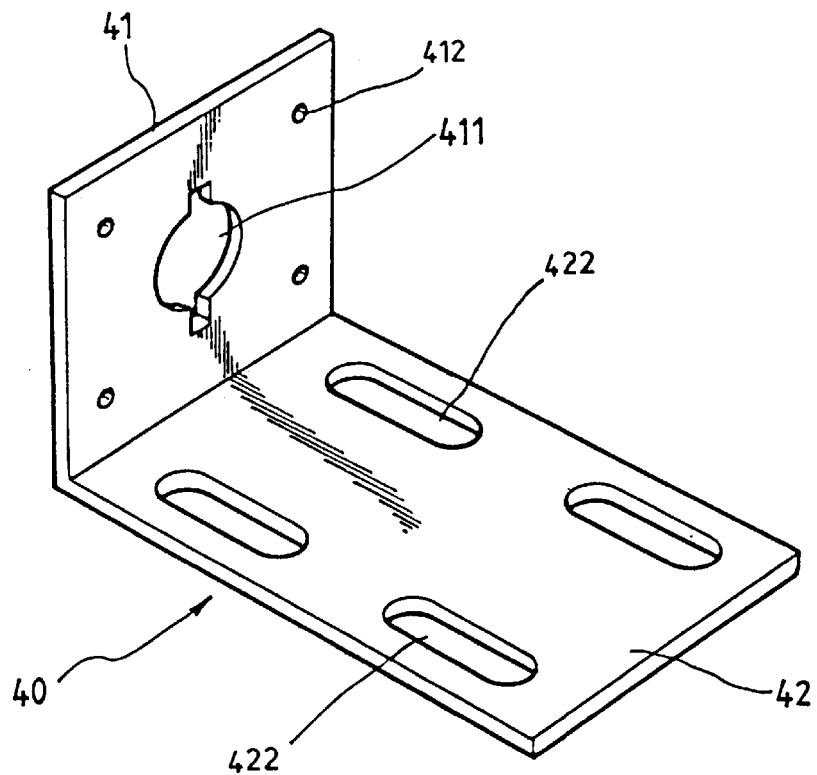
FIG. 5 shows a perspective view of the supporting means according to another embodiment of the present invention.

It should be apparent that instead of the hole 421 in FIG. 2, longitudinally extended holes 422 as shown in FIG. 5 may be used for longitudinal movements of the supporting means 40.

Figure 6:
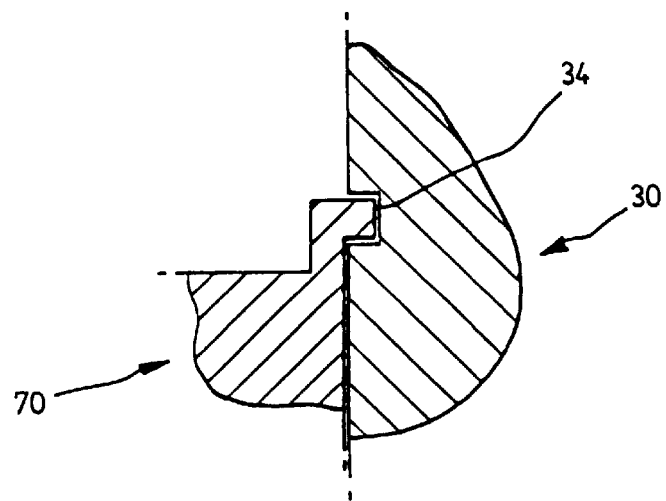
FIG. 6 shows the protection means of the present invention installed in a housing in detail.

In addition, as shown in FIG. 6, the possible occurrence of the floating of the protection means 70 when exchanging one fan 4 for another may be minimized by a guide groove 34 formed in a side surface of the housing 30 locating the protection means 70 and into which a leading edge of the protection means 70 is inserted.

According to the present invention, the system for measuring basic characteristics, such as revolution, torque, vacuum, and wind amount enables to measure those characteristics simply by exchanging the fan to be measured, and therefore an effective development and design of the fan are possible.

What is claimed is:

1. A system for measuring and comparing various characteristics for a fan rotated by power generating means, the system comprising:

a housing containing a power generating means therein, the housing being formed with a suction inlet for drawing air during rotation of the fan and a discharge outlet for discharging the air drawn through the suction inlet;

supporting means installed in the housing for supporting the power generating means;

protection means, having at a front surface thereof a suction hole for drawing the air, for protecting breakage of the fan;

a base member having fixing holes therein such that the supporting means is securely fixed to the housing by coupling a fixing member, such as bolt, into the holes;

vacuum measuring means installed to measure a vacuum in the housing and to measure vacuum of air sucked through the section hole of the protection means, for comparing the measurements;

a second shaft coupled to the power generating means opposite to a first shaft of the power generating means;

rotating means coupled to the second shaft;

revolution measurement means adapted to sense revolution of the rotating means for measuring revolution of the power generating means;

detecting means having a pair of light emitting element and light receiving element which are, respectively, located near both sides of the rotating means; and a controller electrically coupled to the detecting means;

wherein when the light emitted from the light emitting element is delivered to the light receiving means through a slot during rotation of the rotating means, the light receiving means in turn outputs pulse signals to the controller, and then the controller measures revolution of the power generating means by counting the pulses received.

2. The system as defined in claim 1, wherein the supporting means comprises:

a front supporting section in which a receiving section is formed for accommodating and fixing the power generating means; and a bottom supporting section integrally formed with the front supporting means and in which a plurality of holes are perforated such that the power generating means is positioned at one selected among locations provided by the holes.

3. The system defined in claim 2, wherein a plurality of longitudinally extended holes are formed in the bottom supporting section of the supporting means, such that the power generating means is arbitrarily located without completely removing the fixing member from the holes formed in the bottom supporting section.

4. The system as defined in claim 1, wherein the rotating means has a through hole for inserting the second shaft, and the slot through which the light is transmitted for measuring revolution of the power generating means.

5. The system as defined in claim 1, wherein the base member comprises a torque table providing torque value, based upon variance of resistance corresponding to an amount of movement of the supporting means caused by a deliverance of a force generated by the rotation of the power generating means.

6. The system of claim 1, further comprising wind amount regulating means for controlling a draining port of the housing so as to maintain optimal vacuum in the housing.

7. The system as defined in any one of claims 1 and 5, wherein a guide groove is formed in a side wall of the housing coupled to the protection means so as to minimize a floating of the protection means occurring during an exchange of the fan.

* * * * *